(12) United States Patent
Slabe

(10) Patent No.: US 6,299,388 B1
(45) Date of Patent: Oct. 9, 2001

(54) UNIVERSAL TOOL HOLDER COLLANT DELIVERY ADAPTERS

(75) Inventor: Brendan Slabe, Waite Hill, OH (US)

(73) Assignee: Slabe Machine Products Company, Cleveland, OH (US)

( * ) Notice: Subject to any disclaimer, the term of this patent is extended or adjusted under 35 U.S.C. 154(b) by 0 days.

(21) Appl. No.: 09/497,824

(22) Filed: Feb. 3, 2000

(51) Int. Cl.[7] .................................................. B23B 27/10
(52) U.S. Cl. .............................. 407/11; 407/100; 407/2; 82/52; 82/901
(58) Field of Search .................................. 407/11, 100, 2, 407/6; 82/52, 50, 901; 408/56, 58, 59, 60, 61

(56) References Cited

U.S. PATENT DOCUMENTS

| | | |
|---|---|---|
| 3,364,800 | 1/1968 | Benjamin et al. . |
| 3,889,520 | 6/1975 | Stoferle et al. ........................ 73/37.5 |
| 4,598,617 | 7/1986 | Kubo et al. . |
| 4,621,547 | 11/1986 | Yankoff . |
| 4,636,118 | 1/1987 | Hunt . |
| 4,695,208 | 9/1987 | Yankoff . |
| 4,791,840 | * 12/1988 | De Rosier et al. ................ 407/11 X |
| 4,955,264 | 9/1990 | Armbrust ............................... 82/158 |
| 5,340,242 | * 8/1994 | Armbrust et al. ..................... 407/11 |
| 5,388,487 | * 2/1995 | Danielsen ........................... 407/11 X |
| 5,702,211 | 12/1997 | Roemer ................................. 408/56 |
| 5,829,331 | * 11/1998 | Mori ................................... 407/11 X |
| 5,890,849 | 4/1999 | Cselle ................................... 408/1 R |
| 6,045,300 | * 4/2000 | Antoun .................................. 407/11 |

* cited by examiner

Primary Examiner—Henry Tsai
(74) Attorney, Agent, or Firm—Arter & Hadden LLP

(57) ABSTRACT

Universal tool holder coolant delivery adapters have adapter bodies which are removably attachable to a tool holder by at least one fastening device, the adapter located between an attachment end of the tool holder and a distal end of the tool holder, the distal end of the tool holder having a cutting tool attached thereto, the adapter bodies having an internal coolant passageway including an intake port and an exit port, the intake port adapted for attachment to a pressurized coolant supply line and the outlet port adapted for attachment to or configured in the form of a coolant spray nozzle, the coolant spray nozzle being closely positioned and substantially aligned with the cutting interface of the cutting tool and a workpiece.

20 Claims, 4 Drawing Sheets

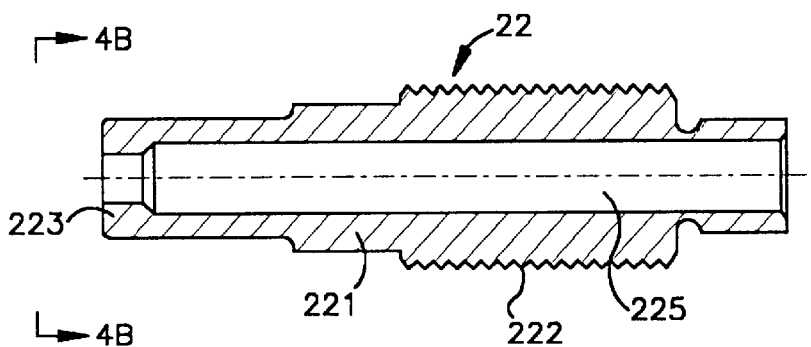
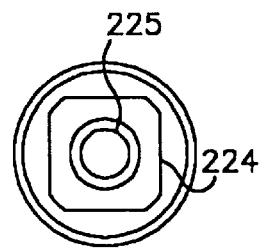
Fig.4A  Fig.4B
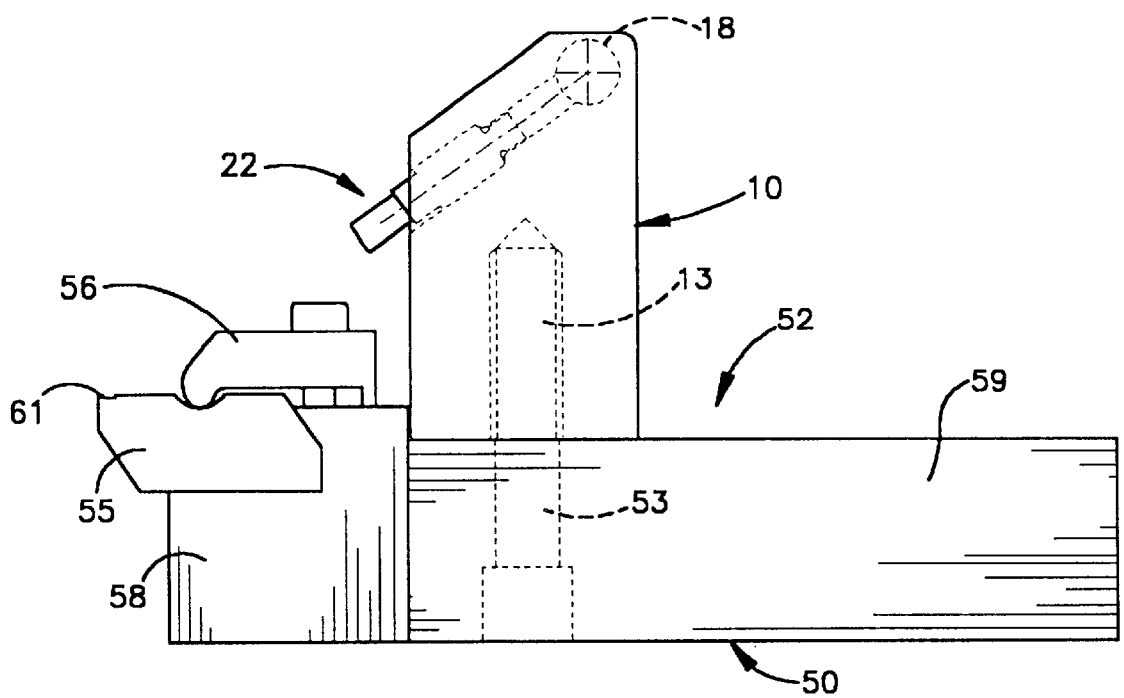
Fig.3

UNIVERSAL TOOL HOLDER COLLANT DELIVERY ADAPTERS

FIELD OF THE INVENTION

The present invention is in the general field of machining and metal working and, more specifically, in the field of tools and systems for cutting and machining steel and metal.

BACKGROUND OF THE INVENTION

Machines that are designed for cutting metal or steel do so by applying various tools to a workpiece. In various types of turning operations, this can be done by having a rotating tool approach a fixed workpiece or by spinning the workpiece itself (such as a piece of bar stock) as the tool comes in contact from a certain angle. The moving contact of the tool with the stock produces a large amount of heat which must be dissipated to avoid destroying the tool. Most cutting machines are equipped with a coolant reservoir and a low pressure pump that sprays coolant over the entire machining process from hoses with diameters as large as one inch. The purpose is to flood the entire cutting process which, in theory, improves the tool life by minimizing the temperature increase. This approach has several flaws, one of which is the fact that when machining certain high-temperature steels, the temperature is elevated high enough to literally burn away the coolant at the interface of the tool and the workpiece. Although it appears as if there is coolant covering the area of tool contact with the workpiece, there is actually a microscopic vapor pocket at the point of contact created by the intense heat. The described hoses are insufficient for this purpose. Increasing the coolant pump pressure, and reducing the size of the hose orifice, helps to reduce the heating, but at the cost of using much more coolant, and requires that the coolant hose be strongly secured to the machinery, to avoid the whipping fire hose effect action.

Relatively recently, machine tool manufacturers have increased the size and power of the pumps that are supplied with metal working machines. Within the last ten years, high pressure coolant pump systems, such as the type manufactured and sold by ChipBLASTER Ltd. have been used to deliver coolant at pressures in the range of 5000 psi at the cutting interface. The much higher pressure of the coolant requires customized fixtures to direct the coolant to the cutting interface.

One approach to direct pressurized coolant flow through the tool holder, to which the cutting tool is attached. For example, U.S. Pat. Nos. 4,695,208 and 4,955,264 disclose tool holders with coolant flow passageways through the body of the holder, with an exit port at the tool attachment point, or through a tool holder attachment insert. An inherent disadvantage of this approach is the complexity and cost of manufacturing the passageway through the tool holder. In the event the tool holder is damaged, as frequently happens in the event of a "crash" wherein the tool holder is driven too fast into the workpiece, the entire tool holder (with the coolant passage and coolant hose fitting) must be replaced. Another approach is to integrate the coolant passageway in a portion of a custom tool holder other than the attachment shank. This requires the tool holder to have extra mass, including an enlarged shank which requires larger clearances in machine set-ups. It also requires replacement of the entire tool holder in the event of damage, and is therefore a very expensive approach to cooling. Also, in these types of tool holders the orientation or angle of the coolant exit port is fixed relative to the cutting tool. In many applications, a particular fixed angle of coolant delivery may not provide adequate or optimized cooling action.

SUMMARY OF THE PRESENT INVENTION

To overcome these and other disadvantages of the prior art, and to provide improved cooling in metal working, machining and turning, the present invention provides universal tool holder coolant delivery adapters which are removably attachable to a wide variety of tool holders for optimized coolant delivery. Because the adapters are detachable from the tool holders, they are interchangeable with any tool holder of similar style and tool geometry. Existing tool holders can be modified for attachment to the coolant delivery adapters, affording manufacturers the benefit of being able to retain the substantial investment they have made in their current tool holders.

In accordance with one aspect of the invention, there are provided universal tool holder coolant delivery adapters which have a body configured for attachment to a tool holder by at least one fastening device, the adapters locatable between an attachment end of the tool holder and a distal end of the tool holder, the distal end of the tool holder having a cutting tool attached thereto, the adapter bodies having an internal coolant passageway including an intake port and an exit port, the intake port adapted for attachment to a coolant supply line and the outlet port adapted for attachment to a coolant spray nozzle, the coolant spray nozzle oriented to point at the cutting tool attached to the tool holder.

These and other aspects of the invention are herein described in particularized detail with reference to the accompanying Figures.

BRIEF DESCRIPTION OF THE FIGURES

In the accompanying Figures:

FIG. 3 is an elevation of a universal tool holder coolant delivery adapter of the invention attached to a tool holder;

FIG. 4A is a cross-sectional view of a coolant spray nozzle of the universal tool holder coolant delivery adapter of the invention;

FIG. 4B is an end view of the coolant spray nozzle of FIG. 4A, and

DETAILED DESCRIPTION OF PREFERRED AND ALTERNATE EMBODIMENTS

Figure 1B:
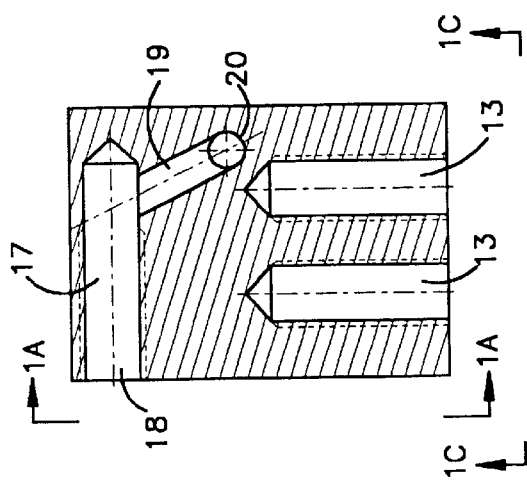
FIG. 1B is a cross-sectional view of the universal tool holder coolant delivery adapter of FIG. 1A.

As shown in FIGS. 1A–1D, one particular embodiment of the invention includes a universal tool holder coolant delivery adapter, indicated generally at 10, which is configured for attachment to a tool holder 50. The adapter 10 includes a body 12 with a mounting surface 14. The tool holder 50 has a body 51 with at least one generally flat surface 52 with which the mounting surface 14 of the adapter 10 is placed in contact. One or more set screws 30 are threaded through the tool holder body 51 through bores 53, and into female threaded bores 13 in the adapter body 12 to securely, and removably, attach the adapter 10 to the tool holder 50. Although shown with bores 53 and 13 oriented generally orthogonally through the tool holder body 51 and adapter body 12, it is within the scope of the invention to alternatively orient the bores so that the adapted is attachable to the tool holder at various angles. Also, multiple mounting bores may be provided in both the tool holder and the adapter so that different positions and angles can be set up with the same combination of parts, i.e., tool holder and adapter. For example, the adapter 10 may be swiveled on the tool holder mounting surface to fine tune the angle of incidence of the coolant spray, or moved fore or aft on the tool holder mounting surface to alter the spray characteristics. Alternatively, in place of one of the fastener bores 13, 53, an indexing key and notch can be provided, or a single key 8 for example which protrudes from the mounting surface 14 of the adapter body and one or more notches 9 in the tool holder 50, in a radial pattern about the remaining fastener bore.

Attached to the tool holder 50 is a cutting tool 55 held in place at a distal end or head 58 of the tool holder body 51 by an attachment clamp 56 in a conventional manner. The position of the adapter 10 upon the tool holder body 12, relative to the cutting tool 55, and between head 58 and attachment end 59 and proximate to head 58, is selected to optimize the distribution of coolant from the adapter 10 on to the cutting tool 55 and at the cutting interface with a workpiece, as further described below.

The adapter body 12 further includes an internal coolant passageway 16 having an intake port 18 and an outlet port 20. The intake port 18 is configured for attachment of a fitting at the end of a coolant supply line 19. The coolant supply line 19 is connected to a pressurized coolant delivery system (not shown), as manufactured for example by Chip-BLASTER Ltd., which provides a continuous pressurized stream of coolant, typically in the range of approximately 500 psi. The outlet port 20 is configured to receive, for example by threaded engagement, a coolant spray nozzle 22. The internal coolant passageway 16 can be routed through the body 12 of the adapter 10 in different directions and angles, which may be chosen by design for any particular tool holder configuration or customer preference. In this particular embodiment, the internal coolant passageway 16 through the adapter body 12 is routed so that the intake port 18 is located on a side 24 of body 12, and the outlet port 20 is located on a side 26 of body 12, which is adjacent and generally orthogonal to side 24. Also, the bore size or diameter of the passageway 17 leading from the intake port 18 is slightly larger than the bore size or diameter of the passageway 19 leading to the outlet port 20. The relative internal dimensions of the passageway 16 can be selectively chosen to optimize the coolant delivery pressure and spray parameters, in combination with the spray nozzle 22. Preferably, the coolant passageway 16 is generally linear in order to avoid creating turbulence in the coolant, which can compromise the cooling efficiency of the coolant by the introduction of air. It has been discovered that even a slight angle bend or turn of a few degrees in the coolant passageway can create enough turbulence to reduce cooling efficiency, particularly when the coolant is under pressure in the approximate range of 5000 psi or greater.

The exterior of the adapter body 12 can be selectively configured (i.e., chamfered, tapered or angled) to optimize clearances and tolerances in any machine set-up. Preferably, the adapter body 12 has a size and mass selected according to the coolant hose connection and nozzle positioning functions. In an extreme example of the invention, the adapter body 12 may be no more than a connector which extends from a nozzle, and is sufficiently rigid to hold the nozzle in place while under pressure of coolant delivery.

Alternatively, the adapter body 12 can be in the form of a nozzle receptacle which releasably engages a nozzle attached to a coolant line, by for example threads or a twist lock arrangement. In this manner, the nozzle can remain with the coolant line, and be coupled to any coolant delivery adapter body.

Figure 1C:
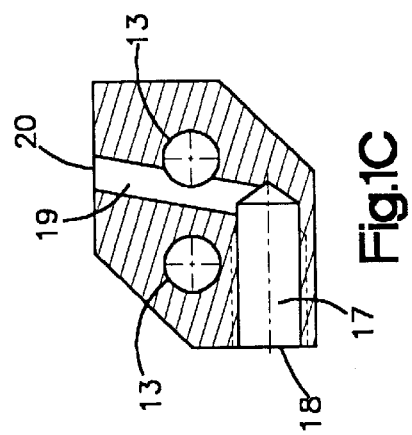
FIG. 1C is a cross-sectional view of the universal tool holder coolant delivery adapter of FIG. 1A.
Figure 1A:
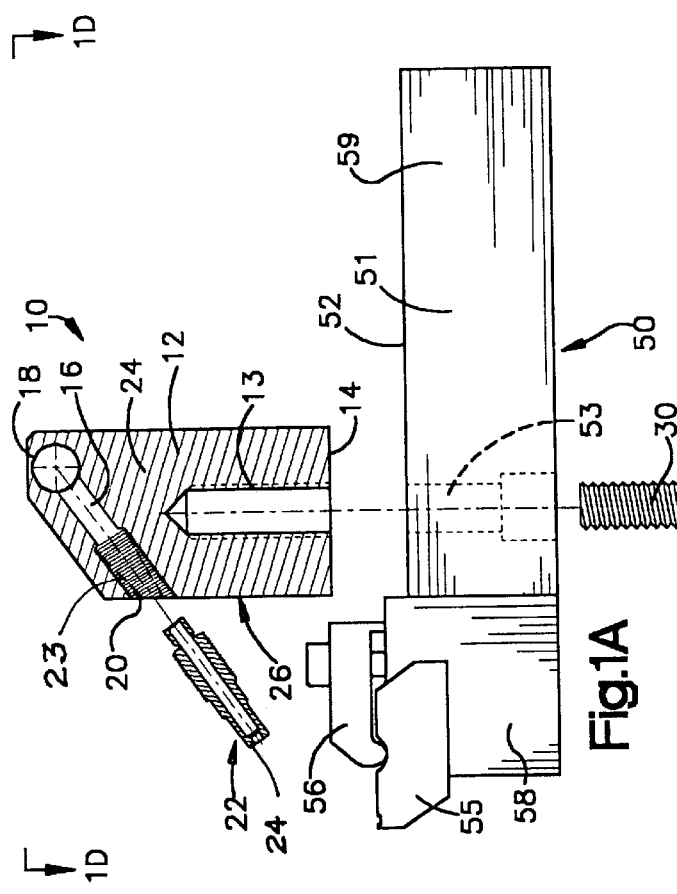
FIG. 1A is an elevation assembly view of one embodiment of a universal tool holder coolant delivery adapter of the invention, shown in combination with a tool holder.
Figure 1D:
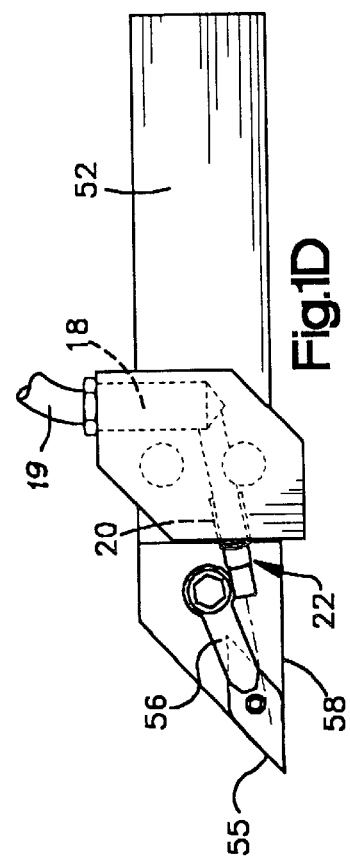
FIG. 1D is a top view of the universal tool holder coolant delivery adapter of FIG. 1A.
Figure 2B:
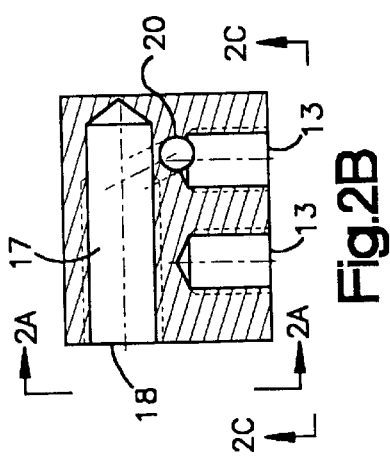
FIG. 2B is a cross-sectional view of the universal tool holder coolant delivery adapter of FIG. 1A.
Figure 2C:
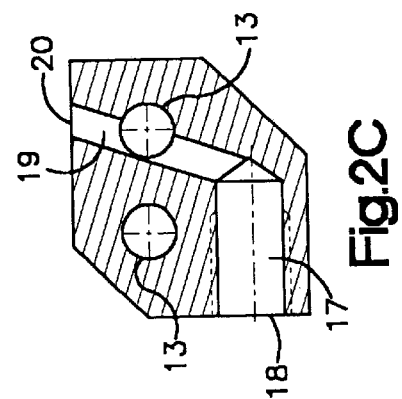
FIG. 2C is a cross-sectional view of the universal tool holder coolant delivery adapter of FIG. 1A.
Figure 2A:
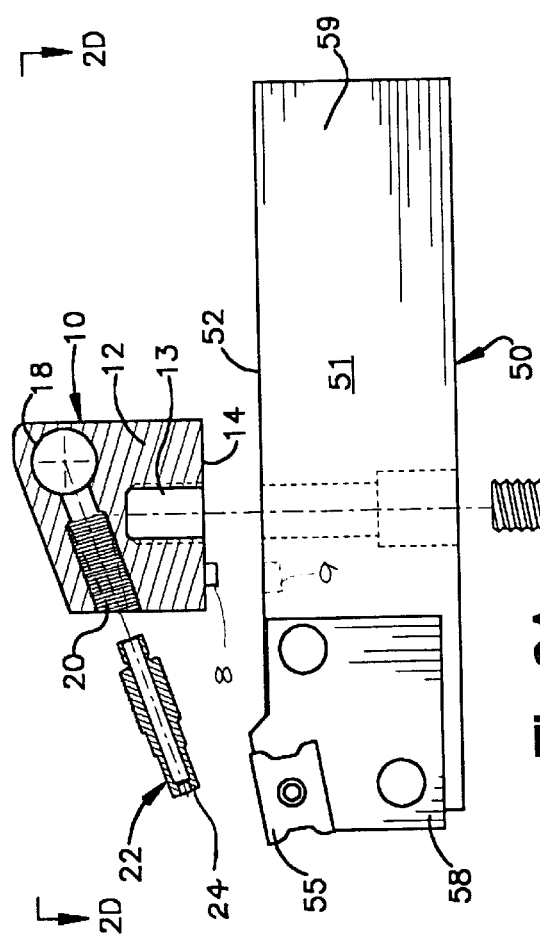
FIG. 2A an elevation assembly view of an alternate embodiment of a universal tool holder coolant delivery adapter of the invention, shown in combination with a tool holder.

Alternatively, the outlet port 20 of the internal coolant passageway 16 in the adapter body 12 can be configured in the form of a generally tapered internal nozzle 23, as shown in phantom in FIGS. 1A and 2A. With this construction, the requirement of a separate part or fitting, such as nozzle 22, is eliminated, thus reducing the complexity and cost of the adapter 10. Information on the size, angle and flow rate of the internal nozzle 23 can be placed or coded on the exterior of the adapter body 12 to assist in selecting the right adapter for a particular application.

Figure 2D:
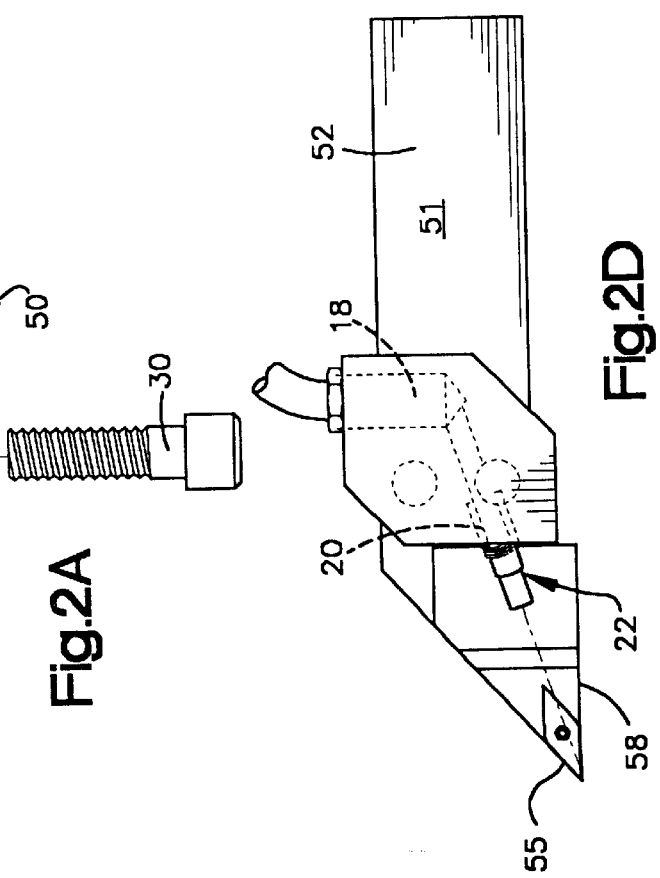
FIG. 2D is a top view of the universal tool holder coolant delivery adapter of FIG. 2A.

FIGS. 2A–2C illustrate an arrangement similar to FIGS. 1A–1C, but wherein the adapter body 12 is smaller in overall size, and the angle of the outlet port passageway 19 is less than that in FIG. 1A relative to the surface 52 of the tool holder body 51. This particular arrangement may be employed for common tool holder configurations where additional clearance at the distal end 58 of the tool holder 50 is required, or where a coolant flow path more closely aligned with tool holder surface 52 results in improved cooling efficiency and chip removal. As shown by comparison of FIGS. 1A and 2A, different types of cutting tools 55 can be interchanged with different configurations of adapters 10, in combination with the same or different tool holders 50, in order to optimize cooling and chip removal efficiency. Also, interchanging of different coolant spray nozzles 22 with the adapter bodies 10, for example nozzles 22 different internal sizes and geometry's and lengths, can be done to further optimize the coolant spray or flow pattern for any particular cutting or milling operation. For example, the nozzle tip 24 may be selectively positioned to extend beyond the outlet port 20 to achieve more direct delivery of coolant to the cutting interface. Most preferably, the nozzle 22 is generally aligned with the cutting or contact axis of the cutting tool 55 to insure uniform bilateral flow and distribution during the cutting process, and the nozzle tip 24 is as close as possible to the contacting point of the cutting tool 55 without obstructing the exit path or trajectories of shavings or chips cut by the tool. An example of this is best shown in FIG. 2D, where the axis of the nozzle 22 is substantially aligned with an axis or centerline of the cutting tool 55. This avoids excess heat build-up on one side of the cutting tool which can lead to premature failure.

FIG. 3 illustrates a universal tool holder coolant delivery adapter 10 connected to a tool holder 50, wherein the coolant spray nozzle 22 is aimed directly at the cutting tip 61 of the tool 55, where the greatest amount of heat is generated during a cutting operation, and where metal chips are produced. As described above, nozzle 22 which extends an even greater length out of the adapter body 12 toward the cutting tool 55 could be used in this set-up. For example, as shown in FIGS. 4A and 4B, a coolant spray nozzle 22 has a body 221 with external threads 222 for engagement with the outlet port 20 of the adapter body 12, and a distal end 223 provided with flats 224 (FIG. 4B) for assembly and disassembly with the adapter body 12. The internal bore 225 of the nozzle 22 may be substantially constant as shown, or taper particularly at or near the distal end 223. The interchangability of nozzles 22 with adapters 10 provides extreme flexibility and extreme ease of set-up when compared to the fixed alignment that is provided with traditional coolant hoses.

Figure 5:
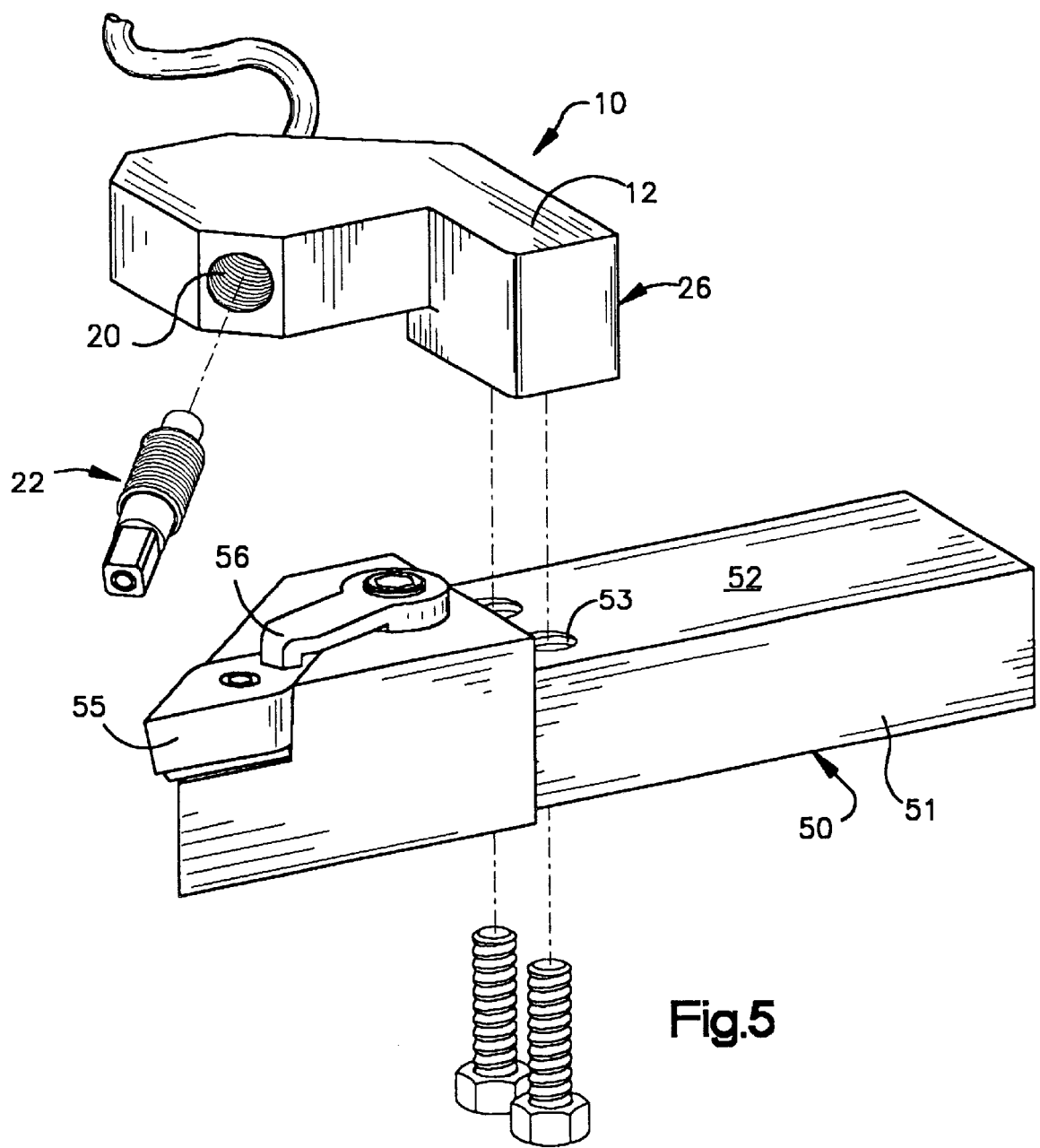
FIG. 5 is a perspective view of an alternate embodiment of the universal tool holder coolant delivery adapter of the invention.

FIG. 5 illustrates an additional alternative embodiment similar to that shown in FIGS. 2A–2C, but wherein the adapter body 12 is even smaller in overall size, and the angle of the outlet port passageway 19 is less than that in FIG. 2A relative to the surface 52 of the tool holder body 51.

The invention thus provides universal tool holder coolant delivery adapters which are attachable to a wide variety of tool holders to achieve optimum coolant delivery to the cutting interface. The adapters are not limited to use with one particular tool holder, and thus can be exchanged and used with replacement holders in the case of equipment repair or replacement. Dependent upon the type of cutting tool being used, an adapter can be selected to deliver coolant at any desired angle to increase cooling efficiency and rate of chip removal. The interchangeable nozzles allow different pressures to be produced and the coolant stream to start closer to or farther from the cutting interface.

Although the invention has been shown and described with reference to certain preferred and alternate embodiments, it will be appreciated that modifications and variations on the basic concepts and principles of the invention are within the scope of the invention. For example, without limitation, detachable adapters of different configurations could be made (especially for adaptation to the more common "dove tail" form and shave tool holders that are widely used on screw machines), and the adapters may include multiple coolant passageways and nozzles, and have alternative attachment mechanisms for attachment to tool holders. These and other variations are all within the scope of the invention.

What is claimed as the invention is:

1. A universal tool holder coolant delivery adapter configured for separable attachment to a tool holder to deliver and direct coolant to a cutting tool attached to the tool holder by a clamp, the adapter having:
   a) an adapter body having a surface area configured for mounting contact with an exterior surface of a tool holder proximate to and not in contact with the cutting tool and the cutting tool clamp;
   b) a fastener which extends from the adapter body and capable of engagement with a tool holder on an external surface of the tool holder between a clamp and a tool attachment end of the tool holder;
   c) an internal coolant passageway having an inlet port and an outlet port, the inlet port configured for attachment to a coolant supply line, and the outlet port configured for attachment to a coolant spray nozzle;
   d) the coolant spray nozzle oriented to point toward a cutting tool attached at a distal end of the tool holder and oriented at an angle relative to a surface of the tool holder to which the adapter is attached.

2. The universal tool holder coolant delivery adapter of claim 1 wherein a portion of the adapter body which is placed in contact with the tool holder has a width dimension substantially equal to a width dimension of the contact surface of the tool holder.

3. The universal tool holder coolant delivery adapter of claim 1 in combination with a tool holder, wherein the adapter body is selectively positionable relative to the tool holder.

4. The universal tool holder coolant delivery adapter of claim 1 wherein the coolant spray nozzle is engaged by threaded connection with the adapter body.

5. The universal tool holder coolant delivery adapter of claim 1 wherein the coolant spray nozzle is formed in the internal coolant passageway in the adapter body.

6. The universal tool holder coolant delivery adapter of claim 1 wherein the adapter body extends laterally beyond the tool holder.

7. The universal tool holder coolant delivery adapter of claim 1 in combination with a tool holder, the tool holder having a shank and a head, and the adapter body being attached to the shank of the tool holder proximate to the head, and having a portion which extends away from the shank towards the head, the outlet port located in the portion which extends away from the shank towards the head.

8. The universal tool holder coolant delivery adapter of claim 1 in combination with a tool holder wherein the nozzle is positioned beyond a periphery of the tool holder.

9. In combination, a tool holder for holding a cutting device in contact with a workpiece, and a coolant delivery adapter for delivering coolant to a cutting interface between the cutting device and the workpiece;
   the tool holder having:
      a shank configured for attachment to a machine, the shank having an attachment end and a distal end, and a head which extends from the distal end, wherein the cutting device is attached to the head by a clamp,
   the coolant delivery adapter having:
      a) an adapter body having a surface area configured for separable and adjustable mounting contact with an external surface of a tool holder; proximate to and not in contact with the cutting device and the cutting device clamp;
      b) a fastener which extends from the adapter body and capable of engagement with a tool holder on a surface of the tool holder between a clamp and the attachment end of the tool holder;
      c) an internal coolant passageway having an inlet port and an outlet port, the inlet port configured for attachment to a coolant supply line, and
      d) the outlet port oriented to point toward a cutting tool attached at a distal end of the tool holder and oriented at an angle relative to a surface of the tool holder to which the adapter is attached.

10. The combination of claim 9 wherein the adapter body is attached to the shank of the tool holder proximate to the head.

11. The combination of claim 9 further comprising a coolant spray nozzle engaged with the outlet port of the adapter body.

12. The combination of claim 9 wherein the adapter body has a width dimension substantially equal to a width dimension of the tool holder.

13. The combination of claim 9 wherein the adapter body has a width dimension greater than a width dimension of the tool holder, and wherein the outlet port of the adapter body is positioned generally lateral to the cutting device attached to the tool holder.

14. The combination of claim 9 wherein the adapter body comprises a notch in which a cutting device clamp fits.

15. The combination of claim 9 wherein the coolant in the adapter body is substantially linear.

16. The combination of claim 9 whereby the adapter body is selectively positionable relative to the tool holder.

17. The combination of claim 11 wherein a coolant spray nozzle engaged with the outlet port of the adapter body can be adjusted and set to extend a selected distance beyond a perimeter of the adapter body.

18. The combination of claim 9 wherein the outlet port is oriented to direct coolant flow in a direction within thirty degrees of a direction in which the cutting device points.

19. In combination, a tool holder for holding a cutting tool to be placed in contact with an object to be cut such as a piece of steel, the tool holder having a shank and a head, the shank having an attachment end and distal end, the cutting tool being secured to the head of the tool holder by a clamping device, a coolant delivery adapter removably attached to the shank of the tool holder between the clamping device and the attachment end, adjacent to and not in contact with the cutting and the clamping device by removable fasteners which extend between the adapter and the tool holder, the coolant delivery adapter having an adapter body with a coolant delivery passageway, with a coolant inlet port on one side of the adapter body and an outlet port on another side of the adapter body, the coolant inlet port configured to accept a coolant line, and the outlet port configured to direct a spray of coolant upon the cutting tool.

20. A cutting tool coolant delivery system for providing optimized cooling of a cutting tool during a cutting or milling operation in which a cutting tool is placed in contact with a rotating workpiece, the coolant delivery system comprising:

a coolant delivery adapter having an adapter body with a mounting surface for attachment to a tool holder, the tool holder having a shank and a head, the head engaging a cutting tool, and at least one fastener securing the coolant delivery adapter to the tool holder proximate to the head;

the coolant delivery adapter further having an intake port for connection to a pressurized coolant supply line connected to a pressurized coolant delivery supply;

an outlet port for directing pressurized coolant at the cutting tool;

an internal coolant passageway extending from the intake port to the outlet port through the adapter body;

the coolant delivery adapter being selected and fastened to the tool holder according to the size and dimensions of the tool holder, and according to the orientation of the cutting tool on the tool holder, the coolant delivery adapter being fastened to the tool holder so that an axis of the outlet port is generally aligned with a centerline of the cutting tool and positioned as close as possible to a cutting tip of the cutting tool without interfering with chips or shavings removed by the cutting tool from the workpiece.

* * * * *

UNITED STATES PATENT AND TRADEMARK OFFICE
CERTIFICATE OF CORRECTION

PATENT NO. : 6,299,388 B1
DATED : October 9, 2001
INVENTOR(S) : Brendan Slabe

It is certified that error appears in the above-identified patent and that said Letters Patent is hereby corrected as shown below:

<u>Title page,</u>
In the title the word "coolant" is misspessled. The title should read as -- UNIVERSAL TOOL HOLDER COOLANT DELIVERY ADAPTERS --

Signed and Sealed this

Ninth Day of April, 2002

*Attest:*

JAMES E. ROGAN
*Attesting Officer*    *Director of the United States Patent and Trademark Office*